(12) United States Patent
Krauklis et al.

(10) Patent No.: US 7,611,351 B2
(45) Date of Patent: Nov. 3, 2009

(54) RADIANT GAS BURNER

(75) Inventors: Andrei V. Krauklis, Minsk (BY); Pawel S. Laptsevich, Minsk (BY); Vitali A. Zhdanok, Minsk (BY)

(73) Assignee: Chemical Physics Technologies, Inc., Vernon Hills, IL (US)

( * ) Notice: Subject to any disclaimer, the term of this patent is extended or adjusted under 35 U.S.C. 154(b) by 687 days.

(21) Appl. No.: 11/166,391

(22) Filed: Jun. 24, 2005

(65) Prior Publication Data
US 2006/0292510 A1 Dec. 28, 2006

(51) Int. Cl.
*F23D 14/12* (2006.01)
(52) U.S. Cl. .................. 431/328; 431/326; 431/354; 431/170
(58) Field of Classification Search ............ 431/328, 431/326, 354, 170, 217
See application file for complete search history.

(56) References Cited

U.S. PATENT DOCUMENTS

| | | | |
|---|---|---|---|
| 3,635,644 A | * | 1/1972 | Reid, Jr. .......................... 431/9 |
| 3,852,025 A | * | 12/1974 | Placek .......................... 431/329 |
| 4,437,833 A | | 3/1984 | Mertz |
| 4,889,481 A | | 12/1989 | Morris |
| 5,427,525 A | * | 6/1995 | Shukla et al. ................ 431/350 |
| 5,474,443 A | | 12/1995 | Viessmann et al. |

FOREIGN PATENT DOCUMENTS

RU    2 084 762 C1    7/1997

OTHER PUBLICATIONS

Russian Article (ISSN 0016-5581).
Russian Article (6206-000).

* cited by examiner

*Primary Examiner*—Alfred Basichas
(74) *Attorney, Agent, or Firm*—Fay Sharpe LLP; Karl W. Hauber

(57) ABSTRACT

A radiant gas burner is provided having a casing adapted for connection with an air-gas mixing and supply system including a flux dissector and a mixer. The burner further includes a metallic mesh emitter inside the casing having lower and upper meshes. The lower mesh and the upper mesh each have porous openings. Each of the lower and upper meshes having a radius of curvature wherein the lower mesh is spaced apart from the upper mesh.

21 Claims, 2 Drawing Sheets

RADIANT GAS BURNER

FIELD OF INVENTION

The invention relates to the field of engineering with respect to combustion of gaseous fuel and gas heaters/burners. More specifically, the present invention relates to radiant gas burners applied both in industrial and consumer applications.

Infrared Radiation gas burners, alternatively referred to hereinafter as IR or radiant burners, allow the replacement of heat transfer by convection with more economical radiant or convective radiant means. IR gas burners enable increased heat transfer efficiency to an object being heated by using radiant heat exchange. Due to efficient radiant cooling of an emitting surface, the temperature in the combustion zone decreases which results in a much lower nitric oxide (NO) content in the combustion products.

BACKGROUND OF THE INVENTION

Ceramic matrices or sets of metallic meshes are used as radiating elements in radiant gas heaters. A radiant gas burner with a radiating element in the form of a two-layer ceramic matrix is described in U.S. Pat. No. 4,889,481. A downstream air-gas mixture motion is therein described, wherein a burner body comprises a first layer of porous ceramic material adjacent an inlet side and a second layer of porous ceramic material adjacent an outlet side. The first layer is 0.25 mm thick and possesses a porous structure with pore diameter of between 0.01 and 2.5 mm. The thickness of the second layer is 1.25 cm and also includes a porous structure with a pore diameter of between 1.25 and 10 mm. The shortcomings of the above described burner include high flow resistance and brittleness of the material layers (ceramic matrix).

Industrial IR burners with low carbonic oxide (CO) and nitric oxide (NO) content in combustion products are known, for example, from Russian patent publication no. 2,084,762. The typical industrial IR burner, described therein, consists of a casing, IR deflector, an injector with a nozzle and mixer, a reflector with a shelf, a radiating ceramic mouthpiece, and a mesh. Accommodating the reflector at some distance from the injector's outlet allows uniform combustion along the whole burner's surface and reduces the carbonic oxide and nitric oxide content in the combustion products. One of the shortcomings of this type of burner is that the ceramic mouthpiece poorly withstands thermal and physical shocks and thus, is of little use in burners for domestic gas cookers. Additionally, burners with ceramic mouthpieces have a limited power control range.

An industrial radiant burner is also known (see for example U.S. Pat. No. 4,437,833) to work in heat units using natural and liquefied gas of medium pressure. This type of industrial radiant burner usually consists of a casing, a nozzle unit, an injector, a dissector, an emitting orifice, and a screen mesh. The emitting orifice can be a unit of 32 holed ceramic plates, for example, having a fire channel diameter of 0.85 mm. The casing can include an emitter consisting of refractory mesh and a reflecting screen of metallic wire fixed in the casing. Combustion occurs in between the refractory mesh and the reflecting screen. To provide uniform air-gas mixture flow distribution, dissector plates are accommodated inside the casing. The major drawbacks of the industrial radiating burner, as of all burners with ceramic radiating elements, are insufficient resistance to physical and thermal shocks, small power control range, and high flow resistance.

Using metallic meshes, instead of ceramic radiating elements, has found application in radiating burners for hot-water boilers. These types of burners consist of a flat holder with a supply gas line, see for example U.S. Pat. No. 5,474,443. There is a radiating element fixed on the holder that constitutes a metallic mesh of hemispherical shape and at least a one holed gas-distributing surface of the same shape. Air-gas mixture combustion occurs above the mesh surface. To obtain sufficiently complete combustion above the surface of the metallic mesh, one needs an object returning part of the mesh emission back towards the metallic mesh. Such an object in the burner considered can be a boiler furnace surface surrounding the burner, thereby limiting this type of application in other devices.

Other challenges associated with metallic emitters include a larger portion of radiant energy from the emitter going in the opposite direction of the heat receiver, thereby resulting in undesirable heating of the burner's casing.

Another metallic mesh IR burner is known and comprises a set of metallic meshes located downstream from the flow of the air-gas mixture. A first distributing mesh converts a dynamic component of the pressure into a static one. At the same time, the first mesh shields the burner's casing against backspattered emission. A second and a third mesh are coupled as one pack and form a burner's emitter. A fourth protective mesh guards the emitter against mechanical damages. The burner also accommodates a gas nozzle and an injection air-gas mixer located in parallel with, and under, a distributing mesh (O. N. Bryukhanov et. al., Unified Metallic-Mesh IR Burner, Gazovaya Promyshlennost, N 3, 1985). In the given burner, the first mesh is made of a punched metallic plate. Efficiency of "trapping" backscattered emission via the mesh(es) is directly related to the total area of the holes made in the plate, i.e. with a real plate cross-section. Increasing the efficiency of backscattered emission "trapping" requires lower "real" plate cross-section. Meeting this requirement will lead to high flow resistance of the gas dissector and consequently to lower working capacity of the burner in general. This is a significant drawback of the given design of the gas dissector.

Another disadvantage of the aforementioned burner is that the location of the air-gas mixer does not ensure uniform distribution of the air-gas mixture on the emitter surface and causes additional flow resistance. Further shortcomings of the burner also include the fact that structurally reliable automatic ignition can't be provided. Ignition can be done from outside the burner only, i.e. from above the latter downstream air-gas mixture flow towards the mesh. If one uses spark, resistive or another ignition, during the burner operation, the ignition unit will be within an undesirable high temperature zone.

SUMMARY OF THE DISCLOSURE

A radiant gas burner is provided including a burner having a casing with a first aperture therethrough. The burner further included at least one air-gas mixer connected to the casing to provide an air-gas mixture flow. The casing includes a gas dissector between the air-gas mixer and an emitter whereby the air-gas mixture flows through the dissector. The dissector comprises a grid having ribs defining an upper grid plane and a lower grid plane.

A radiant gas burner is provided including a casing adapted for connection with an air-gas mixing and supply system having a flux dissector and a mixer. The burner further includes a metallic mesh emitter, inside the casing, having lower and upper meshes. The lower mesh and the upper mesh each have porous openings. The lower mesh openings have a size and the upper mesh openings have a size. The lower mesh opening size is less than the upper mesh opening size. Each of the lower and upper meshes has a radius of curvature greater than the burner's diameter.

A radiant gas burner is provided including a casing adapted for connection with an air-gas mixing and supply system. The burner includes a metallic mesh emitter, inside the casing, having a lower mesh and an upper mesh. The lower mesh is spaced apart from the upper mesh. The lower mesh and the upper mesh are shaped substantially in the form of a lens. At least one of the lower and upper meshes forming a convex side of the lens shape.

BRIEF DESCRIPTION OF THE DRAWINGS

Various exemplary embodiments according to this invention will be described in detail, with reference to the following FIGURES wherein.

DETAILED DESCRIPTION

Figure 1:
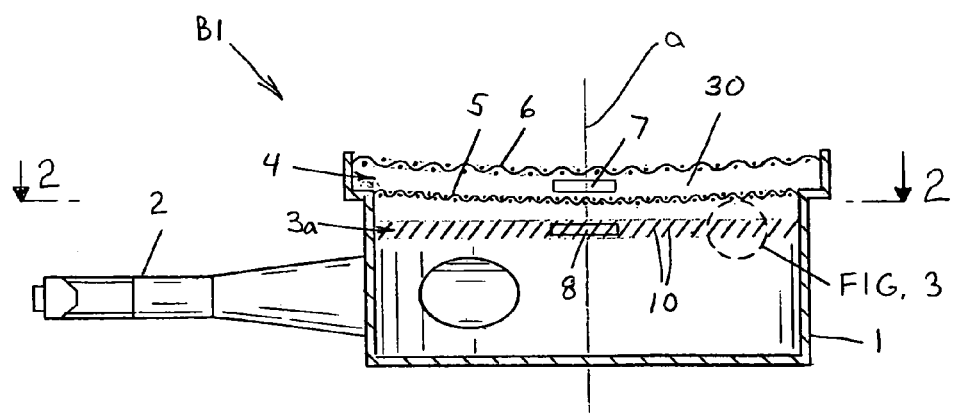
FIG. 1 is a cross-sectional view of a first embodiment of a radiant gas burner having emitter meshes in the form of a convex-concave lens; and, FIG. 2 is a cross-sectional view along line 2-2 of the gas burner according to FIG. 1.

The given invention, to be described in more detail below, provides for a radiant gas burner which improves the quality of gas mixture combustion, reduces nitric oxide and carbonic oxide content in the combustion products, and increases the burner's efficiency owing to more uniform air-gas mixture flow. The mixture can be introduced tangentially into the casing and allowed to flow through a gas dissector, the gas dissector increases uniformity of the air-gas mixture flow. Additionally, the gas dissector acts as a shield to catch back-scattered emission and as a heat exchanger to heat the air-gas mixture at the same time.

The design of the radiant gas burner described in detail below, assures reliable automatic ignition owing to the location of the apertures available in the burner's casing and the gas dissector.

Location of emitter meshes is also an important improvement of the radiant gas burner. In one embodiment a lower and an upper mesh can be arranged so that a combustion zone is a biconvex lens. Part of the IR radiation from the lower and upper meshes is focused onto an inter-mesh zone of combustion, intensifying the latter. The result is that gas combustion quality increases and carbonic oxide content in the combustion products decreases. In another embodiment, the meshes can be disposed in such a way that the combustion zone forms a convex-concave lens, whereas both meshes are placed with a convex side facing the air-gas mixture flux.

Referring to FIGS. 1-5, where the components of a radiant gas burner to combust gas fuel are therein provided, including a casing with an aperture to ignite air-gas mixture, an air-gas mixer connected to the casing, and a gas dissector installed in the casing generally transverse to air-gas mixture flux. The gas dissector can be a grid including ribs having an inclination of about 50-60° relative to a plane transverse to a central axis a. The edges of adjacent ribs can be in the same plane perpendicular to that of a grid. The ribs can be in the form of flat or punched plates, or concentric cone rings.

The radiant gas burner also includes a metallic-mesh emitter installed in the casing thereof generally perpendicular to the air-gas mixture flux. The emitter accommodates at least lower and upper meshes downstream from the air-gas mixture motion, and can include different sized mesh openings. The emitter meshes can be installed into the casing thereof so that they form an inner cavity in the form of a lens. The lens form can have a curvature radius of at least the burner's diameter and can have a thickness of at least 8-10 times the size of the lower mesh openings. In addition, the upper and lower meshes of the emitter can form a biconvex or convex-concave lens.

To facilitate automatic ignition of the air-gas mixture, a first aperture in the casing can be provided between the upper and lower meshes of the emitter. A second aperture can be provided in the dissector. The apertures can be of the same size and aligned such that there is a space therebetween.

Improvements are particularly secured by the design of the radiant gas burner that includes a casing in the form of a cylinder and an air-gas mixer connected with the casing thereof so as to ensure air-gas mixture input tangentially. The radiant gas burner can have one or several air-gas mixers of the same or different capacity, connected to the casing thereof as to ensure the air-gas mixture input into the casing in one direction (i.e. clockwise or counter-clockwise).

The casing of the radiant gas burner can consist of two or more parts with a separate air-gas mixture supply to each of them.

Figure 2:
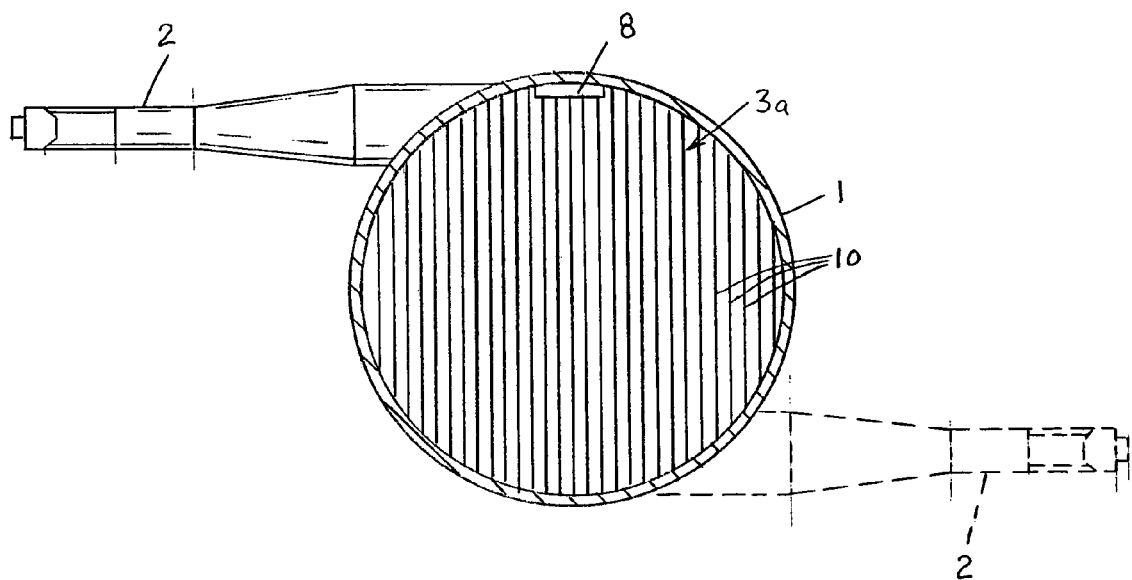

Referring now to FIGS. 1 and 2, FIG. 1 displays a first embodiment of a radiant gas burner for gas fuel combustion, which comprises a cylindrical casing 1, an injection-type air-gas mixer 2, a gas dissector 3a, and a metallic-mesh emitter 4 having a lower mesh 5 and an upper mesh 6 forming a convex-concave lens. The casing includes an aperture 7 located in between the lower mesh 5 and the upper mesh 6 of emitter 4. Gas dissector 3a can also include an aperture 8 adjoining casing 1 (refer to FIG. 2). Apertures 7 and 8 can be the same size and can be located so that the distance between their centers is minimal.

The radiant gas burner operates as described below. The gas entering mixer 2 injects some amount of air necessary for combustion and is mixed therewith. The injection-type gas mixer 2 can be fixed to cylindrical casing 1 so that air-gas mixture enters casing 1 tangentially at low velocity. The air-gas mixture flux can acquire rotary motion, thereby moving circularly inside casing 1 and being reverberated from a cylindrical surface and the bottom of casing 1. The air-gas mixture is directed to the center of the casing and then to emitter 4. Thus, due to such attachment of mixer 2 to cylindrical casing 1, more uniform flux distribution is obtained along the whole area of lower mesh 5 of emitter 4. Such solution produces uniform flux distribution by the whole emitter area even at its large dimensions without special flux bumpers, which are used in the existing radiant gas burners [see for example, IR, Unified, Wind-Proof Gas Burner GIIV-3.65. Operation Manual. Kazan, 1989].

Casing 1 can accommodate several air-gas mixers 2, e.g., to decrease overall dimensions. In one illustrative example, in order to prevent additional higher flow resistance during collision of separate air and gas fluxes, mixers 2 are fixed to casing 1 so as to ensure air-gas mixture input into the casing in one direction, clockwise or counter-clockwise (FIG. 2).

Figure 3:
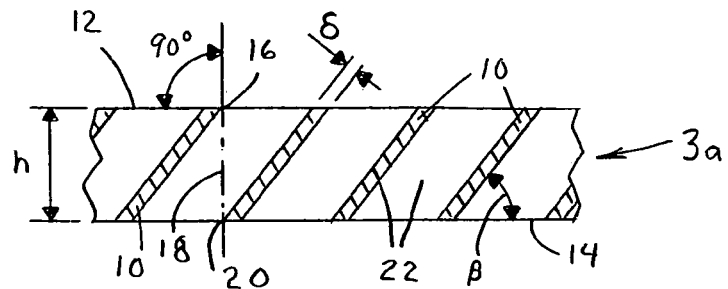
FIG. 3 is a detailed view of area 3 including a gas dissector grid of the gas burner according to FIG. 1.

Gas dissector 3a, which is located along the pathway of air-gas mixture flux ahead of emitter 4, allows increasing uniformity of air-gas mixture flux distribution by emitter 4. Gas dissector 3a is used to reflect part of the emission from emitter 4 which is directed towards burner bottom, as well as to heat air-gas mixture incoming for combustion. Gas dissector 3a can be in the form of a ribbed grid (plate-type heat exchanger) comprising ribs 10 which are inclined to an upper grid plane 12 and a lower grid plane 14. To promote reflection of the emission, edges of adjacent ribs can be in the same plane perpendicular to that of the grid (FIG. 3). For example, an upper edge 16 of one rib can be connected by a plane 18 to a lower edge 20 of an adjacent rib, wherein plane 17 is perpendicular to grid planes 12, 14. Emission hitting the grid heats the ribs 10 and then the air-gas mixture flux passing through gaps 22 between the ribs of the grid is heated by convective heat transfer. This enables increasing heat to be released during gas combustion thereby raising burner performance.

To ensure reliable automatic ignition, aperture 8 can be provided in gas dissector 3a and aperture 7 can be provided in casing 1. A portion of the air-gas mixture entering into the space under gas dissector 3a is directed to aperture 8, since the gas dissector has low flow resistance. This same portion of the air-gas mixture passes through lower mesh 5 of emitter 4 and to aperture 7, as upper mesh 6 of emitter 4 also possesses low flow resistance. An automatic igniter (not illustrated) can be fixed opposite aperture 7 outside the burner casing. Air-gas mixture combustion can occur in the space between meshes 5 and 6 of emitter 4 and the igniter can be positioned outside high temperature zone and thus will not interfere with a heat receiver located above emitter 4.

To facilitate ignition, apertures 7 and 8 can have similar dimensions. Aperture 8 can be along a side of casing 1 and geometrical centers of the apertures 7, 8 can be aligned including a distance therebetween.

The cross-section of the gas dissector grid is one of its defining parameters. On the one hand, it must be as small as possible to ensure high effectiveness of backscattered emission "trapping" and/or reflection, and on the other hand, it must be sufficiently large to assure low flow resistance to the incoming air-gas mixture. Thus, the maximum allowable flow resistance of the gas dissector grid provides a limitation to the increasing effectiveness of backscattered emission trapping.

The area of the grid surface contacting the air-gas mixture flux is another parameter. A larger contact surface enables more heat to be transferred from the heated grid to the air-gas flux. The grid ribs as shown and described provide for an increase to the contact surface area and an increase in heat transfer.

Figure 4:
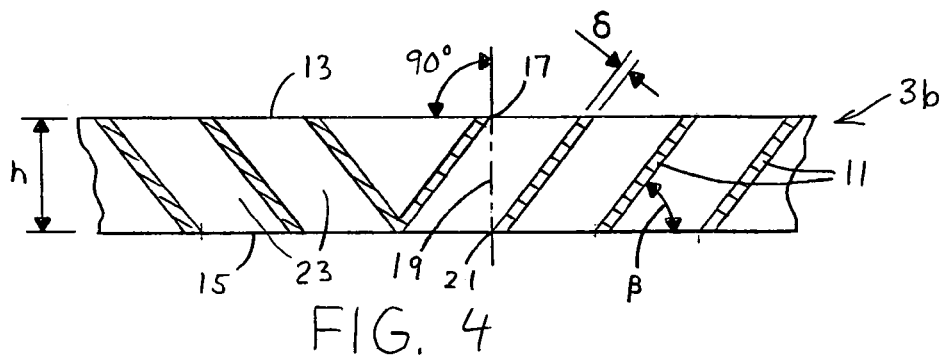
FIG. 4 is a detailed view of an alternative gas dissector grid.

To increase heat transfer and its effectiveness in the gas dissector, one can use corrugated plates or rings to form a ribbed grid (FIG. 4). An alternative gas dissector 3b can be made in the form of coupled concentric cone rings 11. To align upper and lower edges 17, 21 of adjacent ribs in the same vertical plane 19 (between an upper grid plane 13 and a lower grid plane 15), a larger diameter of one ring can be equal to a smaller diameter of another adjoining ring. Thus, the gas dissector grid 3b provides: low flow resistance to the incoming air-gas mixture 23;

maximum heat transfer during heat exchange between the emitter, the gas dissector, and the air-gas mixture flux; and, small dimensions.

Tables 1, 2 and 3 document operational parameters of a gas dissector grid 3a, calculated for a radiant gas burner with specific heat capacity of 200 kW/m², and an emitter's area of 0.01 m². The grid material used was steel 12X18H9T.

The variable parameters included: grid thickness—h, rib inclination to grid plane—β, and rib thickness—δ. The calculated values included: real cross-section of the grid—m, hydrodynamic resistance—Δp (Pa), and heat transferred by convection—Q (W).

TABLE 1

(δ, β = const, h = var.)

| Parameter | Value | | | | | | | |
|---|---|---|---|---|---|---|---|---|
| h, mm | 3 | 5 | 7 | 10 | 15 | 20 | 30 | 50 |
| δ, mm | 1 | 1 | 1 | 1 | 1 | 1 | 1 | 1 |
| β, degrees | 60 | 60 | 60 | 60 | 60 | 60 | 60 | 60 |
| m | 0.53 | 0.63 | 0.67 | 0.73 | 0.75 | 0.80 | 0.825 | 0.833 |
| Δp, Pa | 0.0370 | 0.0160 | 0.0110 | 0.0073 | 0.0049 | 0.0036 | 0.0026 | 0.0018 |
| Q, W. | 117 | 93 | 77 | 66 | 53 | 45 | 36 | 27 |

TABLE 2

(h, β = const, δ = var.)

| Parameter | Value | | | | | | |
|---|---|---|---|---|---|---|---|
| δ, mm | 0.5 | 1.0 | 1.5 | 2.0 | 2.5 | 3.0 | 3.5 |
| h, mm | 5 | 5 | 5 | 5 | 5 | 5 | 5 |
| β, degrees | 60 | 60 | 60 | 60 | 60 | 60 | 60 |
| M | 0.73 | 0.63 | 0.55 | 0.48 | 0.43 | 0.40 | 0.36 |
| Δp, Pa | 0.018 | 0.020 | 0.023 | 0.029 | 0.031 | 0.034 | 0.040 |
| Q, W | 88 | 88 | 88 | 89 | 88 | 90 | 90 |

TABLE 3

($\delta$, h = const, $\beta$ = var.)

| Parameter | Value | | | | | | |
|---|---|---|---|---|---|---|---|
| $\beta$, degrees | 95 | 75 | 60 | 45 | 30 | 15 | 5 |
| h, mm | 5 | 5 | 5 | 5 | 5 | 5 | 5 |
| $\delta$, mm | 1 | 1 | 1 | 1 | 1 | 1 | 1 |
| M | 0.30 | 0.54 | 0.63 | 0.56 | 0.39 | 0.19 | 0.07 |
| $\Delta$p, Pa | 1.000 | 0.070 | 0.020 | 0.015 | 0.025 | 0.085 | 0.600 |
| Q, W | 93 | 93 | 88 | 75 | 65 | 49 | 27 |

As seen from Table 1, increasing the grid thickness h leads to a larger real grid cross-section m on the one hand, and on the other hand, to a prominent reduction of heat Q transferred by the grid to the air-gas flux.

Table 2 shows that increasing grid rib thickness $\delta$ results in smaller real cross-section m of the grid while having little affect on the heat Q transferred by the grid to air-gas flux.

As seen from Table 3, decreasing rib inclination $\beta$ to the grid plane leads to lower heat Q transferred by the grid to air-gas flux and significantly reduces the real cross-section m of the grid.

On the basis of the given data and with regard to the parameters of the gas dissector grid, one preferred embodiment for a grid configuration is as follows: a grid thickness less than or equal to 5.0 mm; a grid rib thickness less than or equal to 1.0 mm; and, a rib inclination to grid plane from about 45° to about 60°.

As described above, the gas mixture combustion occurs in metallic-mesh emitter 4 between meshes 5 and 6. A greater portion of the heat during combustion is transferred to lower mesh 5, which, when heated, becomes a source of IR. The upper mesh 6 intensifies the combustion process by returning part of the emission back into inter-mesh space 30, and by being heated through the combustion process and emission from lower mesh 5, thereby also becoming a source of IR radiation.

Mesh openings in the meshes, 5, 6 attempt to meet contradictory objectives. On the one hand, they should be sufficiently large to provide low hydrodynamic resistance necessary for normal operation of the injector and, on the other hand, the size of lower mesh 5 openings should avoid flashback. For the upper mesh 6, the total space of open flow area should be sufficiently large to provide low hydrodynamic resistance and at the same time it should return sufficient part of the emission from the lower mesh 5 to maintain combustion in between the meshes.

In one embodiment, the lower mesh openings (not illustrated) can have a maximum opening size of 0.8 mm and the upper mesh openings can have a minimum opening size of 1.5 mm.

The distance between the meshes can be about 8-10 times the size of the lower mesh openings and depends on the ratio of combustion rate and air-gas mixture flow velocity.

Figure 5:
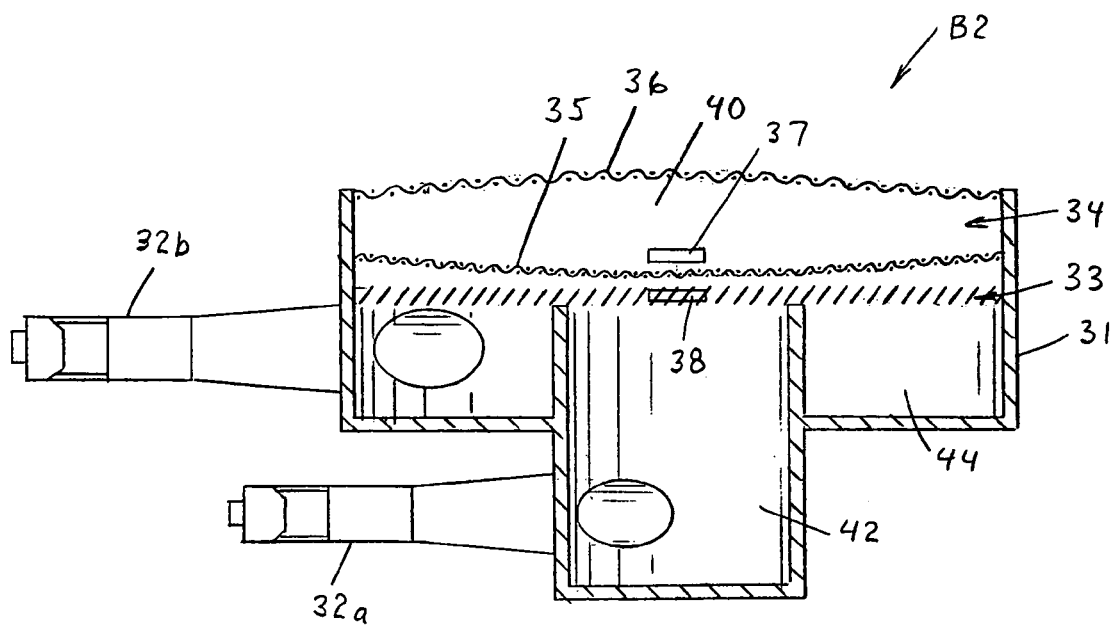
FIG. 5 is a cross-sectional view of a second embodiment of a radiant gas burner having emitter meshes in the form of a biconvex lens.

FIG. 5 shows a second embodiment of a radiant gas burner B2 including casing 31, consisting of two parts or segments. The casing has central 42 and peripheral 44 parts with one air-gas mixer 32a, 32b attached to each of them respectively. The burner B2 also includes a gas dissector 33 and a metallic-mesh emitter 34 including a lower mesh 35 and an upper mesh 36 that form a biconvex lens having an inter mesh area 40 therebetween. A pair of apertures 37, 38 can be positioned in the inter-mesh area and the dissector 33, respectively.

In such burner design, the air-gas mixture can go to different parts of the casing both simultaneously and in turn. In other respects gas fuel combustion occurs as described for the burner design shown in FIG. 1.

In one preferred version of the burner, a metallic-mesh emitter was used with square openings of 0.5×0.5 mm for the lower mesh and 3×3 mm for the upper one. Referring to table 4, comparative experiments were made using a conventional gas-plasma burner (No. 1), and burners with different geometry of a metallic-mesh emitter, namely, with parallel meshes (No. 2), meshes forming a biconvex lens (No. 3) and meshes forming a convex-concave lens (No. 4). All of the burners were of the same power –1.8 kW. The time to heat 2 kg of water to 90° C. was measured and the combustion products composition was determined. Instantaneous and total gas flow rate was monitored during the experiment. The same pan was used to heat water in each experiment. Combustion products composition was determined by gas analyzer TESTO-350. Table 4 gives the results of the comparative experiments.

TABLE 4

| Geometry of metallic mesh emitter | CO content, ppm | NO content, ppm | Time to heat 2 kg $H_2O$ to 90° C. (sec.) | Total gas flow rate during experiment, l |
|---|---|---|---|---|
| No 1 | 60 | 70-80 | 1124 | 37 |
| No 2 | 17-20 | 8 | 1137 | 36.5 |
| No 3 | 1-2 | 4-6 | 1159 | 35.5 |
| No 4 | 10 | 4-5 | 1050 | 32.1 |

As seen from the data given in Table 4, the burner having a combustion zone formed in a biconvex lens (No. 3) resulted in a carbonic oxide content 1-2 ppm or 10 times less than that for a flat burner (No. 2). When heating the same amount of water with a burner in which the combustion space was a convex-concave lens (No. 4), gas flow rate was 12% less (32.1 compared to 36.5) than the burner with flat meshes (No. 2).

As described above, the stated problems can be solved by a radiant gas burner B1, B2 having metallic mesh emitter 4, 34 comprising lower 5, 35 and upper 6, 36 meshes forming an inner cavity 30, 40 in the form of a lens (i.e. convex-concave, biconvex) with a radius of curvature of at least the burner's diameter and a thickness or width of at least 8-10 times the characteristic sizes of the lower mesh openings. The lower mesh having mesh size openings less than the upper mesh size. It is to be appreciated that the lower mesh 5, 35 is in a convex orientation relative to the flow of air-gas mixture.

When the meshes are arranged such that the combustion area is an inner cavity in the form of a biconvex lens (FIG. 5), part of the IR emission from the lower and upper meshes 35, 36 is focused at the inter-mesh combustion area 40, thereby intensifying the combustion process. This results in an increase to the gas combustion quality and a decrease in the carbonic oxide content in the combustion products.

While this invention has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly the exemplary embodiments of the invention, as set forth above, are intended to be illustrative, not limiting. Various changes may be made without departing from the spirit and scope of the invention. Therefore, the claims as filed and as they may be amended are intended to embrace all known or later developed alternatives, modifications, variations, improvements, and/or substantial equivalents.

What is claimed is:

1. A radiant gas burner comprising:
    a burner having a casing with a first aperture therethrough;
        said burner includes at least one air-gas mixer connected to said casing to provide an air-gas mixture flow;
        said casing includes a gas dissector between said air-gas mixer and an emitter, whereby said air-gas mixture flows through said dissector;
        said dissector comprises a grid having ribs defining an upper grid plane and a lower grid plane, a portion of said ribs at an angle of inclination from about 45 degrees to about 60 degrees relative to said lower grid plane; and,
    a lower mesh and an upper mesh positioned above said dissector form a bi-convex lens shape combustion space therebetween, wherein said lower mesh is curved toward said dissector whereby part of the radiant gas emission from said lower mesh and said upper mesh is focused at said combustion space.

2. The radiant gas burner of claim 1, wherein an upper edge of one radiant burner is positioned relative to a lower edge of another adjacent rib whereby a plane connecting said upper edge and said lower edge is perpendicular to said grid planes.

3. The radiant gas burner of claim 1, wherein said emitter is a metallic mesh emitter having spaced apart lower and upper meshes, said lower mesh and said upper mesh each having a plurality of openings therethrough;
    said lower mesh openings having a size and said upper mesh openings having a size, said lower mesh opening size less than said upper mesh opening size; and,
    each of said lower and said upper mesh having a radius of curvature greater than a diameter of said burner.

4. The radiant gas burner of claim 3, wherein said upper and said lower meshes form a biconvex lens.

5. The radiant gas burner of claim 1, wherein said first aperture is positioned between said lower mesh and said upper mesh.

6. The radiant gas burner of claim 1, wherein said dissector includes a second aperture, said first aperture spaced apart from and aligned with said second aperture.

7. The radiant gas burner of claim 1, wherein said ribs have a thickness, said thickness is less than 1.0 mm.

8. The radiant gas burner of claim 1, wherein said upper grid plane and said lower grid plane comprise a grid height therebetween, said grid height is less than 5.0 mm.

9. The radiant gas burner of claim 1, wherein said ribs of said dissector grid are in the form of flat plates.

10. The radiant gas burner of claim 1, wherein said ribs of said dissector grid are in the form of corrugated plates.

11. A radiant gas burner for improving gas combustion quality, comprising:
    a burner having a casing adapted for connection with at least one air-gas mixing and supply system including a flux dissector and a mixer;
    a metallic mesh emitter inside said casing having spaced apart lower and upper meshes, said lower mesh and said upper mesh each having porous openings;
    said lower mesh openings having a size and said upper mesh openings having a size, said lower mesh opening size less than said upper mesh opening size;
    each of said lower mesh and said upper mesh having a radius of curvature greater than a diameter of said burner;
    said at least one air gas mixing and supply system is tangentially connected to said casing whereby an air-gas mixture flow is introduced in a generally circular flow into said casing thereby providing uniform flux distribution along substantially the whole area of said lower mesh; and,
    wherein said lower mesh and said upper mesh form a substantially biconvex lens shape including a combustion space therebetween.

12. The radiant gas burner of claim 11, wherein said spacing between said lower and said upper mesh is at least 4 mm.

13. The radiant gas burner of claim 11, wherein said lower mesh is positioned between said upper mesh and said flux dissector.

14. The radiant gas burner of claim 11, wherein said flux dissector comprises a flat plate having a diameter, said dissector diameter equal to a diameter of an outlet of said mixer.

15. A radiant gas burner comprising:
    a burner having a casing adapted for connection with an air-gas mixing and supply system;
    a metallic mesh emitter inside said casing having a lower mesh and an upper mesh, said lower mesh spaced apart from said upper mesh;
    said lower mesh and said upper mesh shaped substantially in the form of a lens shape including a combustion space therebetween;
    said lower mesh is curved rearwardly and forms a convex side of said lens shape; and,
    wherein said combustion space is in the shape of a biconvex lens and both of said lower mesh and said upper mesh forming convex sides of said lens shape.

16. The radiant gas burner of claim 15, wherein said upper mesh forming a concave side of said lens shape.

17. The radiant gas burner of claim 16, wherein said lower mesh is equidistant from said upper mesh from one side of said casing to another side of said casing.

18. The radiant gas burner of claim 15, wherein said lower mesh is arranged concentrically under said upper mesh.

19. The radiant gas burner of claim 15, wherein the spacing between said lower mesh and said upper mesh is at least 4 mm.

20. The radiant gas burner of claim 19, wherein the spacing between said lower mesh and said upper mesh is between 4 and 5 mm.

21. The radiant gas burner of claim 15, wherein each said lower and said upper mesh having a radius of curvature greater than a diameter of said burner.

* * * * *